United States Patent
Ito et al.

(10) Patent No.: US 7,706,096 B2
(45) Date of Patent: Apr. 27, 2010

(54) DISK DRIVE DEVICE MANUFACTURING METHOD THEREOF, AND METHOD FOR SPECIFYING DATA TRACK PITCH FOR THE DISK DRIVE DEVICE

(75) Inventors: Hideaki Ito, Kanagawa (JP); Kazuyuki Ishibashi, Kanagawa (JP); Kazunari Tsuchimoto, Kanagawa (JP); Osamu Takazawa, Kanagawa (JP)

(73) Assignee: Hitachi Global Storage Technologies, Amsterdam (NL)

( * ) Notice: Subject to any disclaimer, the term of this patent is extended or adjusted under 35 U.S.C. 154(b) by 0 days.

(21) Appl. No.: 12/283,479

(22) Filed: Sep. 11, 2008

(65) Prior Publication Data

US 2009/0073594 A1  Mar. 19, 2009

(30) Foreign Application Priority Data

Sep. 13, 2007 (JP) .............................. 2007-238585

(51) Int. Cl.
*G11B 21/02* (2006.01)

(52) U.S. Cl. ............................. 360/75; 360/31; 360/48; 360/77.02; 360/78.04; 360/78.08

(58) Field of Classification Search ........................ None
See application file for complete search history.

(56) References Cited

U.S. PATENT DOCUMENTS

| | | | | |
|---|---|---|---|---|
| 5,812,337 A * | 9/1998 | Tanaka et al. ............ 360/73.12 |
| 6,023,389 A * | 2/2000 | Cunningham ............... 360/75 |
| 6,052,250 A * | 4/2000 | Golowka et al. ......... 360/77.08 |
| 6,437,947 B1 * | 8/2002 | Uno ......................... 360/78.04 |
| 6,611,395 B1 * | 8/2003 | Chainer et al. ................ 360/75 |
| 6,657,804 B1 * | 12/2003 | Tomiyama et al. ............ 360/60 |
| 6,765,744 B2 * | 7/2004 | Gomez et al. ................. 360/75 |
| 6,950,256 B2 | 9/2005 | Kadokawa |
| 7,002,769 B2 | 2/2006 | Kagami et al. |
| 7,095,575 B2 * | 8/2006 | Miyata et al. ................. 360/31 |
| 7,170,700 B1 * | 1/2007 | Lin et al. ...................... 360/31 |
| 7,242,550 B2 * | 7/2007 | Hara et al. ............... 360/77.02 |
| 7,283,316 B2 * | 10/2007 | Chiao et al. ................... 360/48 |
| 7,535,667 B2 * | 5/2009 | Luo et al. ..................... 360/75 |
| 2002/0075585 A1 * | 6/2002 | Luong et al. .................. 360/31 |
| 2003/0081338 A1 * | 5/2003 | Wang et al. ................... 360/66 |
| 2004/0075937 A1 * | 4/2004 | Tomiyama et al. ....... 360/78.08 |
| 2004/0125496 A1 * | 7/2004 | Schmidt .................. 360/77.08 |
| 2005/0117240 A1 * | 6/2005 | Codilian et al. .............. 360/31 |
| 2006/0082918 A1 | 4/2006 | Kosugi et al. |
| 2007/0133114 A1 * | 6/2007 | Ishii ........................... 360/53 |
| 2007/0279788 A1 * | 12/2007 | Andersen et al. ............. 360/53 |

* cited by examiner

*Primary Examiner*—Dismery E Mercedes
(74) *Attorney, Agent, or Firm*—Townsend and Townsend and Crew LLP; Patrick Duncan (57) ABSTRACT

Embodiments of the present invention help to increase the capacity and the reliability of a disk drive device to improve the manufacturing yield thereof. An embodiment of the present invention sets a data track pitch for each head slider (recording surface) in accordance with head characteristics. This method for specifying the data track pitch is based on the distance between erase band ends (EBEs) of the both adjacent data tracks. The erase band of a data track is a band defined as the area where the already written data are erased in writing the data track. The distance between the erase band ends of the both adjacent data tracks corresponds to the width SW of the area which is not erased by the adjacent data tracks. Specifying the data track pitch based on this leads to increase in the data capacity of each recording surface and secure prevention of occurrence of a squeeze error.

15 Claims, 7 Drawing Sheets

DISK DRIVE DEVICE MANUFACTURING METHOD THEREOF, AND METHOD FOR SPECIFYING DATA TRACK PITCH FOR THE DISK DRIVE DEVICE

CROSS-REFERENCE TO RELATED APPLICATION

The instant nonprovisional patent application claims priority to Japanese Patent Application No. 2007-238585 filed Sep. 13, 2007 and which is incorporated by reference in its entirety herein for all purposes.

BACKGROUND OF THE INVENTION

Disk drive devices using various kinds of media, such as optical disks, magneto-optical disks, flexible magnetic disks, and the like, have been known in the art. In particular, hard disk drives (HDDs) have been widely used as storage devices of computers and have been one of the indispensable storage devices for current computer systems. Moreover, HDDs have found widespread application to moving image recording/reproducing apparatuses, car navigation systems, cellular phones, and the like, in addition to the computers, due to their outstanding characteristics.

A magnetic disk used in an HDD has multiple concentric data tracks and servo tracks. Each servo track contains multiple servo data having address information. Each data track includes multiple data sectors containing user data recorded thereon. Data sectors are recorded between servo data discrete in the circumferential direction. A head element portion of a head slider supported by a swinging actuator accesses a desired data sector in accordance with address information in the servo data to write data to and retrieve data from a data sector.

In order to increase the storage capacity of an HDD or to improve the reliability of an HDD, it has been proposed to specify a data track pitch for each head (each recording surface). Specifying the data track pitch so as to match head characteristics such as a read width or a write width leads to suppression of adjacent track interference (ATI) in data write and increase in data capacity per recording surface.

Two approaches have been proposed to adjust the data track pitch for each recording surface. One is a method to make servo tracks conform to data tracks and adjust the servo track pitch for each recording surface in the servo track write (refer to Japanese Patent Publication No. 2006-114142 "Patent Document 1", for example). The other is a method to provide servo tracks with a common pitch to all recording surfaces and adjust the data track pitch for each recording surface.

In specifying a data track pitch, it is preferable that the data track pitch be as narrow as possible for data capacity while it is preferable that the data track pitch be as wide as possible for the reliability against ATI. Writing a data track in a too narrow data track pitch causes partial erasure of adjacent data tracks so that the adjacent data tracks cannot be accurately read. This is called a squeeze error.

The method disclosed in Patent Document 1 writes a test pattern, and writes adjacent test patterns at the adjacent positions thereto. Then, it measures the error rate of the prior written test pattern. It sequentially writes test patterns while decreasing the data track pith, measures error rates of the test patterns, and determines the narrowest data track pitch at which the error rate satisfies criterion. It specifies the data track pitch to be optimum.

The above method can specify an appropriate data track pitch if ideal accuracy is realized in head positioning. However, an HDD as a product permits changes in head position during a following operation. The HDD continues writing data while the head is positioned within a specific range from the target position, but stops writing data when the head is positioned away from the specific range.

In this manner, the head is always changing its position in the radial direction during data write and the position of the head in the radial direction changes with a certain sigma. Therefore, the error rate measured in the test is not always achieved in actual operation of the HDD and a higher error rate than the one in the test may be exhibited in the HDD as a product due to the changes in head position. In other words, a squeeze error possibly occurs.

Accordingly, in manufacturing of HDDs, it is necessary to specify the data track pitch in consideration of changes in head position in the data write. It is necessary to specify the optimum track pitch without excess or deficiency to increase data capacity without causing a squeeze error in expected changes in head position.

BRIEF SUMMARY OF THE INVENTION

Embodiments of the present invention help to increase the capacity and the reliability of a disk drive device to improve the manufacturing yield thereof. An embodiment of the present invention sets a data track pitch for each head slider (recording surface) in accordance with head characteristics. This method for specifying the data track pitch is based on the distance between erase band ends (EBEs) of the both adjacent data tracks. The erase band of a data track is a band defined as the area where the already written data are erased in writing the data track. The distance between the erase band ends of the both adjacent data tracks corresponds to the width SW of the area which is not erased by the adjacent data tracks. Specifying the data track pitch based on this leads to increase in the data capacity of each recording surface and secure prevention of occurrence of a squeeze error.

DETAILED DESCRIPTION OF THE INVENTION

Embodiments of the present invention relate to a disk drive device, a manufacturing method thereof, and a method for specifying a data track pitch for the disk drive device, more particularly, to specifying a data track pitch in accordance with head characteristics.

An aspect of embodiments of the present invention is a method for specifying a data track pitch of a recording surface in accordance with characteristics of a head in a disk drive device. This method writes a data track adjacent to a subject data track on a recording surface. It measures error rate variation of data preliminarily recorded on the recording surface caused by the adjacent data track to determine an erase band end of the adjacent data track. It specifies a data track pitch of the recording surface based on the distance between erase band ends of adjacent data tracks on both sides of the subject data track. Specifying the data track pitch of the recording surface based on the distance between erase band ends increases the capacity and the reliability of a disk drive device to improve the manufacturing yield thereof.

Servo tracks may be preliminarily recorded on the recording surface, the adjacent data track is written at a target servo address, the erase band end is determined using servo data, and the data track pitch is specified based on the distance between the erase band ends indicated by servo data. This accomplishes more accurate measurement.

The adjacent data tracks may be written on the both sides of the subject data track at the respective target positions, the erase band ends of the both adjacent data tracks are determined, and the data track pitch is specified based on the distance between the determined erase band ends of the both adjacent data tracks. This accomplishes more accurate measurement.

The data track pitch may be specified for the distance to conform to a reference value. This achieves a more appropriate data track pitch. The method may write the subject data track, and measures error rate variation of the subject data track caused by the adjacent data track to determine an erase band end of the adjacent data track by servo data. This accomplishes a more appropriate data track pitch.

The method may write the subject data track, write adjacent data tracks on the both sides of the subject data track, and measure each error rate variation of the subject data track caused by the both adjacent data tracks to determine the distance. This accomplishes a more appropriate data track pitch. The data track pitch may be specified include a deflection range of a head which writes the adjacent data track in response to a command. This, improves reliability.

Another aspect of embodiments of the present invention is a method for manufacturing a disk drive device. This method mounts a disk, a head for accessing a recording surface of the disk, and a moving mechanism for moving the head in an enclosure. It writes a data track adjacent to a subject data track on the recording surface with the head. It measures error rate variation of data preliminarily recorded on the recording surface caused by the adjacent data track using the head to determine an erase band end of the adjacent data track. Then, it specifies a data track pitch of the recording surface based on the distance between erase band ends of adjacent data tracks on both sides of the subject data track. Specifying the data track pitch of the recording surface based on the distance between erase band ends increases the capacity and the reliability of a disk drive device to improve the manufacturing yield thereof.

Yet another aspect of embodiments of the present invention is a disk drive device for specifying a data track pitch of a recording surface in accordance with characteristics of a head. This device comprises a recording surface of a disk for storing data, a head for writing a data track adjacent to a subject data track on the recording surface, and a controller for measuring error rate variation of data preliminarily recorded on the recording surface caused by the adjacent data track to determine an erase band end of the adjacent data track, and specifying a data track pitch of the recording surface based on the distance between erase band ends of adjacent data tracks on both sides of the subject data track. Specifying the data track pitch of the recording surface based on the distance between erase band ends increases the capacity and the reliability of a disk drive device to improve the manufacturing yield thereof.

Embodiments of the present invention help to increase the capacity and reliability of a disk drive device and improve the manufacturing yield thereof.

Hereinafter, embodiments to which the present invention has been applied will be described. For clarity of explanation, the following descriptions and accompanying drawings may have omissions and simplifications as appropriate. Throughout the drawings, like components are denoted by like reference numerals and repetitive descriptions are omitted as not necessary. Hereinafter, a hard disk drive (HDD) will be described as an example of a disk drive device. Embodiments of the present invention feature setting of a data track pitch in an HDD.

Embodiments of the present invention set a data track pitch for each of head sliders (recording surfaces) in accordance with the head characteristics. A method for specifying the data track pitch according to one embodiment uses the distance between the erase band ends of the both adjacent data tracks as a reference. An erase band of a data track is a band defined as an area where the data which have been already written are erased in writing the data track. The distance between the erase band ends of the both adjacent data tracks corresponds to the width of the area which is not erased by the adjacent tracks. Specifying the data track pitch based on this width leads to increase in data capacity in each recording surface and securer prevention of a squeeze error. The prevention of a squeeze error in manufacturing steps can reduce squeeze failures and improve manufacturing yields.

Figure 1:
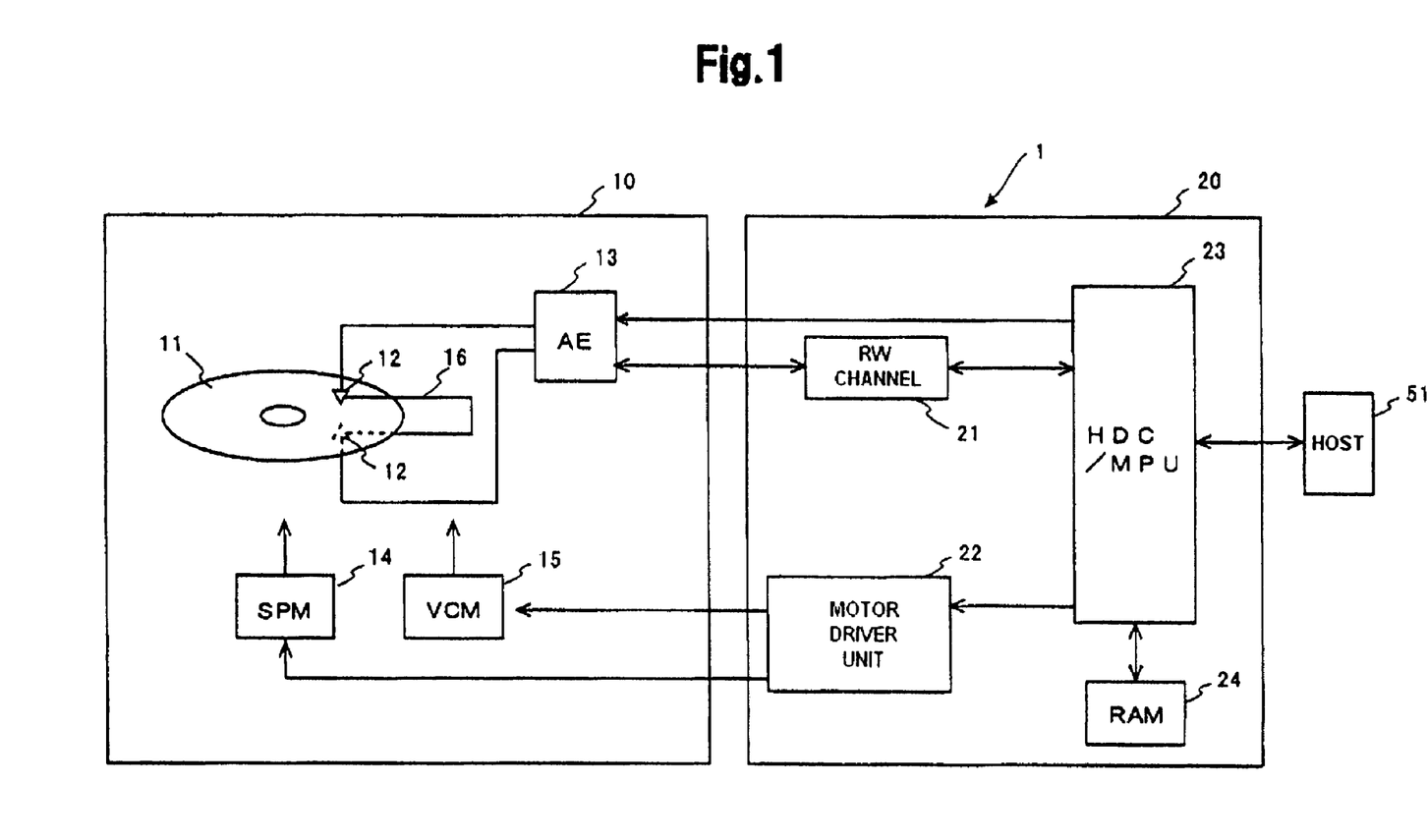
FIG. 1 is a block diagram schematically depicting the entire configuration of a hard disk drive according to one embodiment.

Before describing features of the embodiments, an entire configuration of an HDD will be outlined. FIG. 1 is a block diagram schematically depicting the entire configuration of an HDD 1. The HDD 1 comprises a circuit board 20 fixed outside an enclosure 10. On the circuit board 20, circuits such as a read-write channel (RW channel) 21, a motor driver unit 22, an integrated circuit (HDC/MPU) 23 of a hard disk controller (HDC) and an MPU, and a semiconductor memory, RAM 24 are mounted. In the enclosure 10, a spindle motor (SPM) 14 rotates a magnetic disk 11 at a specific angular rate. The magnetic disk 11 is a disk for storing data. In accordance with control data from the HDC/MPU 23, the motor driver unit 22 drives the SPM 14.

Head sliders 12 each comprise a slider flying over the magnetic disk and a head element portion fixed to the slider for converting magnetic signals into/from electric signals. A head slider 12 is an example of a head. An arm electronics (AE) 13 selects a head slider 12 to access (read or write) the magnetic disk 11 from multiple head sliders 12 in accordance with control data from the HDC/MPU 23 and amplifies read/write signals. Each head slider 12 is fixed to the tip end of an actuator 16. The actuator 16, which is coupled to a voice coil motor (VCM) 15, pivots about a pivotal shaft to move the head slider 12 above the rotating magnetic disk 11 in its radial direction. The assembly of the actuator 16 and the VCM is the moving mechanism of the head. The motor driver unit 22 drives the VCM 15 in accordance with control data from the HDC/MPU 23.

The RW channel 21, in a read operation, extracts servo data and user data from read signals obtained from the AE 13 to decode them. The decoded data are supplied to the HDC/MPU 23. In a write operation, the RW channel 21 codemodulates write data supplied from the HDC/MPU 23 and converts the code-modulated data into write signals to supply them to the AE 13. In the HDC/MPU 23, the HDC is a logic circuit and the MPU operates in accordance with firmware loaded in the RAM 24. The HDC/MPU 23 is an example of a controller and performs entire control of the HDD 1 in addition to processes necessary for data processing such as head positioning control, interface control, defect management, and the like.

Figure 2:
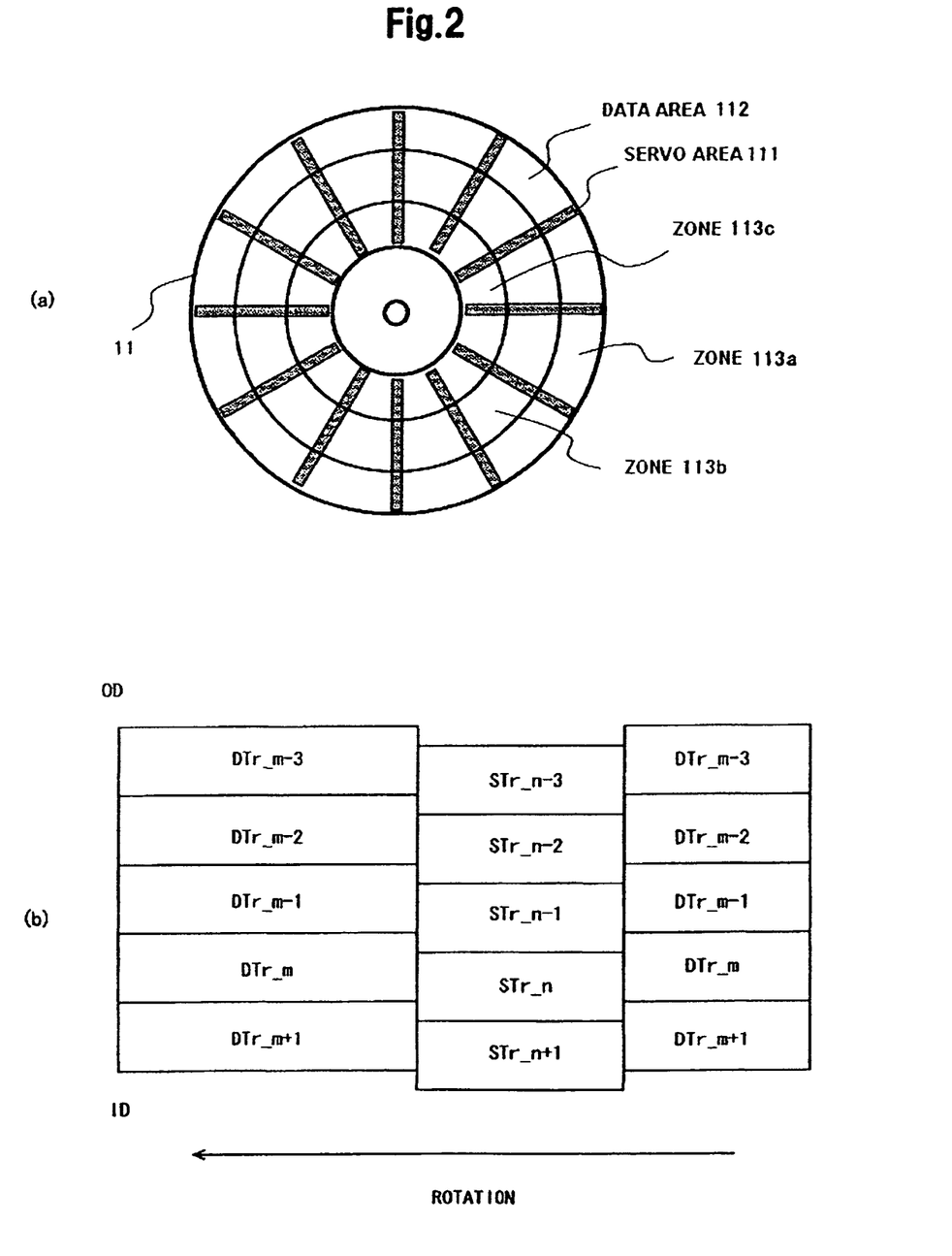
FIGS. 2(a) and 2(b) are diagrams schematically illustrating the data format on a recording surface in one embodiment.

FIG. 2(a) schematically depicts a data structure of an entire recording surface of the magnetic disk 11, and FIG. 2(b) schematically depicts a data format of a part of the recording surface. On the recording surface of the magnetic disk 11, multiple servo areas 111 extending radially in the radial direction from the center of the magnetic disk II and being located discretely at every specific angle, and data areas 112 each formed between two adjacent servo areas 111 are provided. In each servo area 111, servo data for performing positional control of a head slider 12 are recorded. In each data area 112, user data are recorded.

On the recording surface of the magnetic disk 11, multiple data tracks (DTr) having a specific width in the radial direction are formed concentrically. The user data are recorded along data tracks. A data track includes a data sector as a record unit of user data and is typically constituted by multiple data sectors. Typically, a plurality of data tracks are grouped into a plurality of zones 113a to 113c according to their radial positions of the magnetic disk 11. The number of data sectors included in a data track is set to each of the zones.

Similarly, the magnetic disk 11 includes multiple concentric servo tracks (STr) having a specific width in the radial direction. Each servo track is constituted by multiple servo data split by a data area 112. Servo data include a servo track number, a servo sector number in the servo track, and burst patterns for fine positional control. The burst patterns are constituted by, for example, four burst patterns A, B, C, and D different in the radial position. The amplitudes of reproducing signals of each burst pattern can determine the position in the servo track. The position in the servo track can be expressed by a so-called position error signal (PES) value. The PES value is calculated from the amplitudes of the burst patterns A, B, C, and D; and for example, one servo track is divided into 256 PES values in the radial direction.

As illustrated in FIG. 2(b), the servo track pitch does not conform to the data track pitch on the same recording surface in one embodiment. The data track pitches are individually set depending on the characteristics of the head slider 12. Specifying the data track pitch for each head slider 12 leads to the optimum data track pitch corresponding to the characteristics of the head slider 12, which achieves reduction in the adjacent track interference in data write and increase in the storage capacity (the number of data tracks).

A manufacturing method of an HDD 1 manufactures an assembly of head sliders 12 and an actuator 16, and mounts an AE 13 thereon. Further, it mounts this assembly, an SPM 14, magnetic disks 11, and a VCM 15 in an enclosure 10 to manufacture a head disk assembly (HDA). Then the HDA is transferred to a servo write step and servo tracks are written with head sliders 12 each corresponding to each recording surface of magnetic disks 11. This servo write may be performed by a method using a servo track writer (STW) as an external device or a method to write servo data with controlling the VCM 15 in the HDD 1 (self-servo-write). The servo write is a well known technique and detailed descriptions thereon are omitted in the present specification.

In manufacturing the HDD 1, a data track pitch (the distance between the centers of adjacent tracks) is specified for each head slider 12 (each recording surface) after the servo write step. In the present embodiment, the data track pitch is specified in consideration of fluctuation in positioning accuracy of a head slider 12 so as to securely prevent occurrence of a squeeze error. A squeeze error is an error where writing data on both adjacent data tracks to a data track causes partial erasure of the central data track so that the data on the data track cannot be accurately retrieved. If this error is observed in a test step in manufacturing, the HDD is regarded as a squeeze failure and is disassembled.

Figure 3:
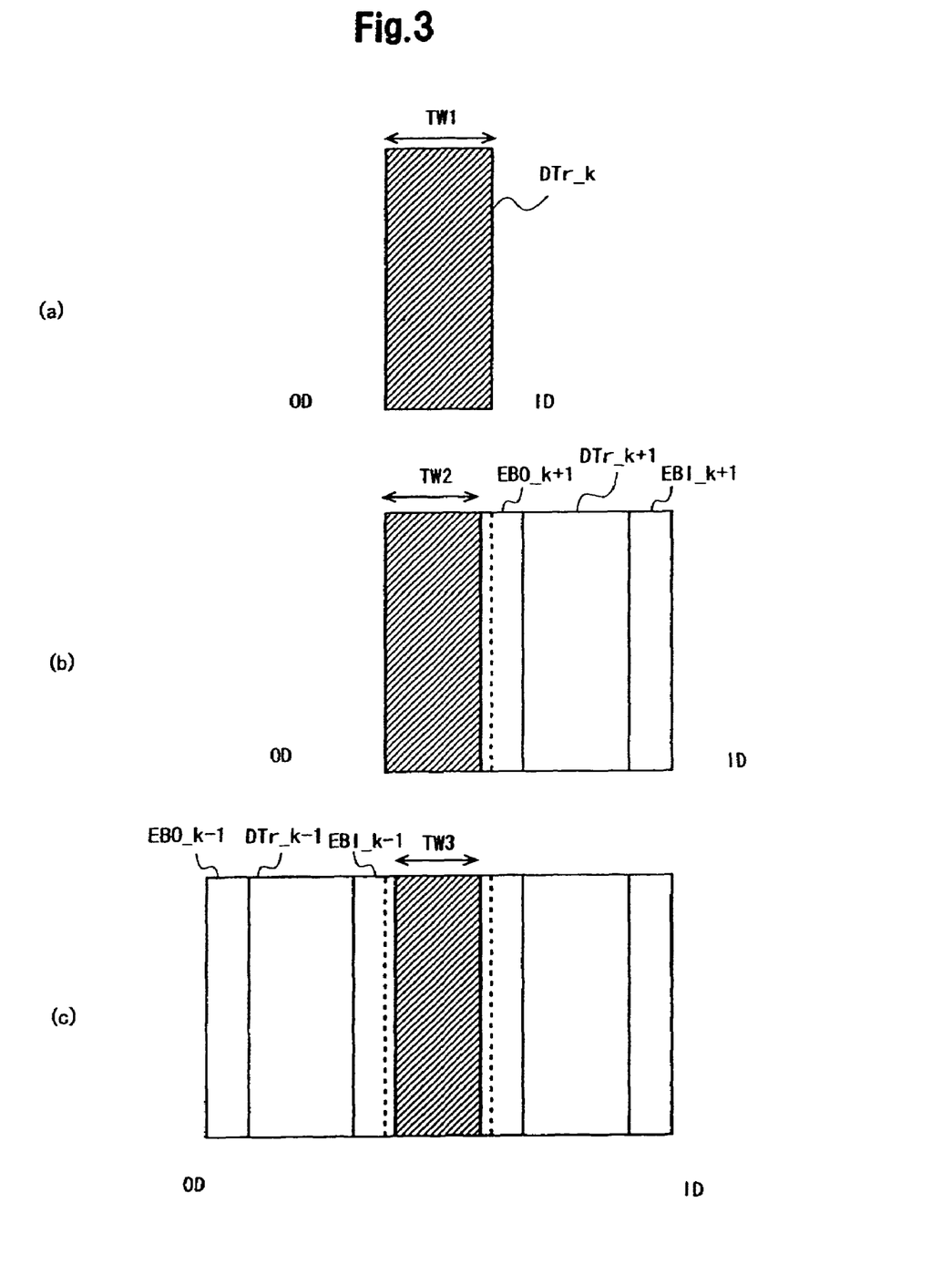
FIGS. 3(a)-3(c) are drawings explaining a squeeze error in one embodiment.

The squeeze error will be explained specifically. As shown in FIG. 3(a), a data track DTr_k has already been written on a recording surface. The data track DTr_k has a data track width of TW1. Next, as shown in FIG. 3(b), a data track DTr_k+1 is written on the inner diameter (ID) side of the data track DTr_k. Erase bands EBI_k+1 and EBO_k+1 accompany the data track DTr_k+1 on both of the inner diameter (ID) and the outer diameter (OD) sides of the data track DTr_k+1, respectively. In data write, the magnetic field generated by a write element including leakage field gradually decreases at both radial ends. Therefore, erase bands that do not have accurate data but erase the data which have already been written are formed on the both sides of the data track on which the data is readable by a read element.

Writing the data track DTr_k+1 causes erasure of a part of the inner diameter side of the data track DTr_k by the erase band EBO_k+1. This reduces the track width of the data track DTr_k from TW1 to TW2. Further, as shown in FIG. 3(c), a data track DTr_k-1 is written on the outer diameter side of the data track DTr_k. Data track DTr_k-1 is accompanied by erase bands EBI_k-1 and EBO_k-1.

Writing the data track DTr_k-1 causes erasure of a part of the outer diameter side of the data track DTr_k by the erase band EBI_k-1. This reduces the track width of the data track DTr_k from TW2 to TW3. Such a squeeze of the central data track DTr_k by the data tracks DTr_k-1 and DTr_k+1 on the both sides becomes a severest condition to the central data track DTr_k. If the track width TW3 of the central data track is too small, the read element of a head slider 12 cannot accurately retrieve data on the data track DTr_k. This is the squeeze error.

Data track ends and erase band ends are defined by designs. Specifically, a data track can be defined as the area where the error rate of written data is the reference value or more. The reference error rate value can be 10-4, for example. Each data sector has error correction codes (ECCs) and the HDC/MPU 23 corrects the retrieved user data using the ECCs. The HDC/MPU 23 can restore user data of the error rate less than a specific error rate by ECCs. The error rate of a data track is small at the middle of the data track and gradually increases as departing from the middle. Data track ends are the positions to exhibit the reference error rate value and the distance between the positions to exhibit the reference error rate values is defined as a data track width.

The erase band end is defined in accordance with influence to the data track (already written data) by the erase band. As shown in FIG. 3(b), the part of a data track overlapping the erase band comes under the influence. The influence by the erase band increases the error rate in the data track. The erase band end is present at the position where the varied error rate becomes the reference error rate value defined by the design. This reference error rate value is the same as the reference error rate value to define the data track end. When a part of the data track has been erased by the erase band, the erase band end conforms to the data track end of the influenced data track DTr_k.

Figure 4:
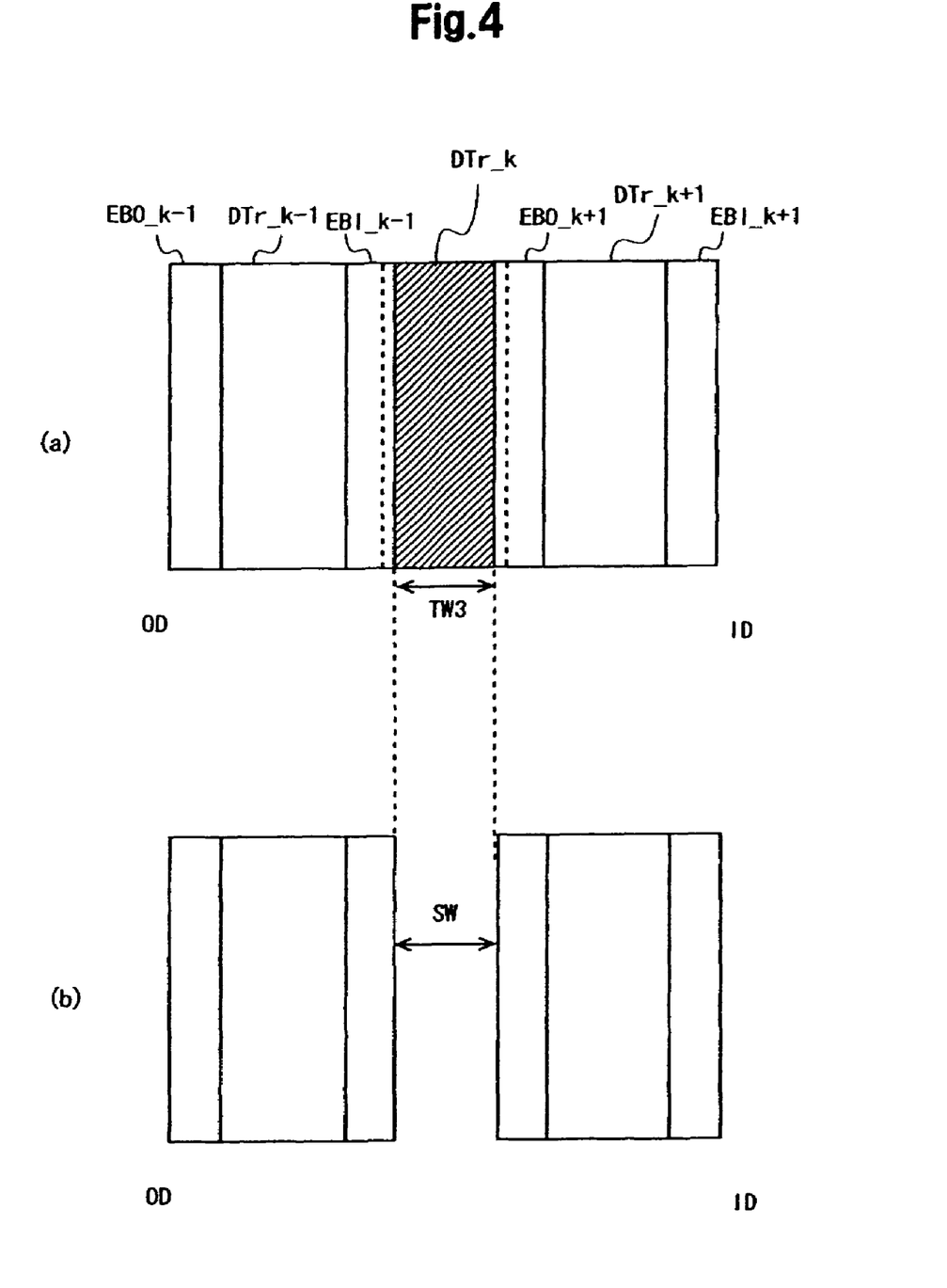
FIGS. 4(a) and 4(b) are drawings illustrating a data track pitch in one embodiment when a squeeze error does not arise.

In order to prevent a squeeze error, a middle data track should have a certain width or more even if data have been overwritten on the data tracks on both sides of the data track as shown in FIG. 4(a). As shown in FIG. 4(b), the squeezed data track width SW of the middle data track is the distance between the erase band ends of the data tracks on the both sides.

The present embodiment determines the erase band of an adjacent data track on either side or the erase bands of the adjacent data tracks on both sides of the selected data track to specify a data track pitch based on the distance between the erase band ends obtained by the determination. Specifically, it specifies the data track pitch so that the distance SW between the erase band ends becomes within a preset reference range (for example, between a first reference value and a second reference value) and preferably the distance SW between the erase band ends becomes the reference value.

One reference value (reference width) of the SW is the minimum value at which a squeeze error does not occur. Specifying the data track pitch so that the SW will conform to this value achieves the maximum capacity without occurrence of a squeeze error. In designing the HDD 1, an appropriate value for this reference width is specified through experiments and simulations. It is necessary to take into account deflection of a write element in data write to determine the minimum distance between the erase bands which may emerge in actual operation of the HDD 1. This will be described later.

Figure 5:
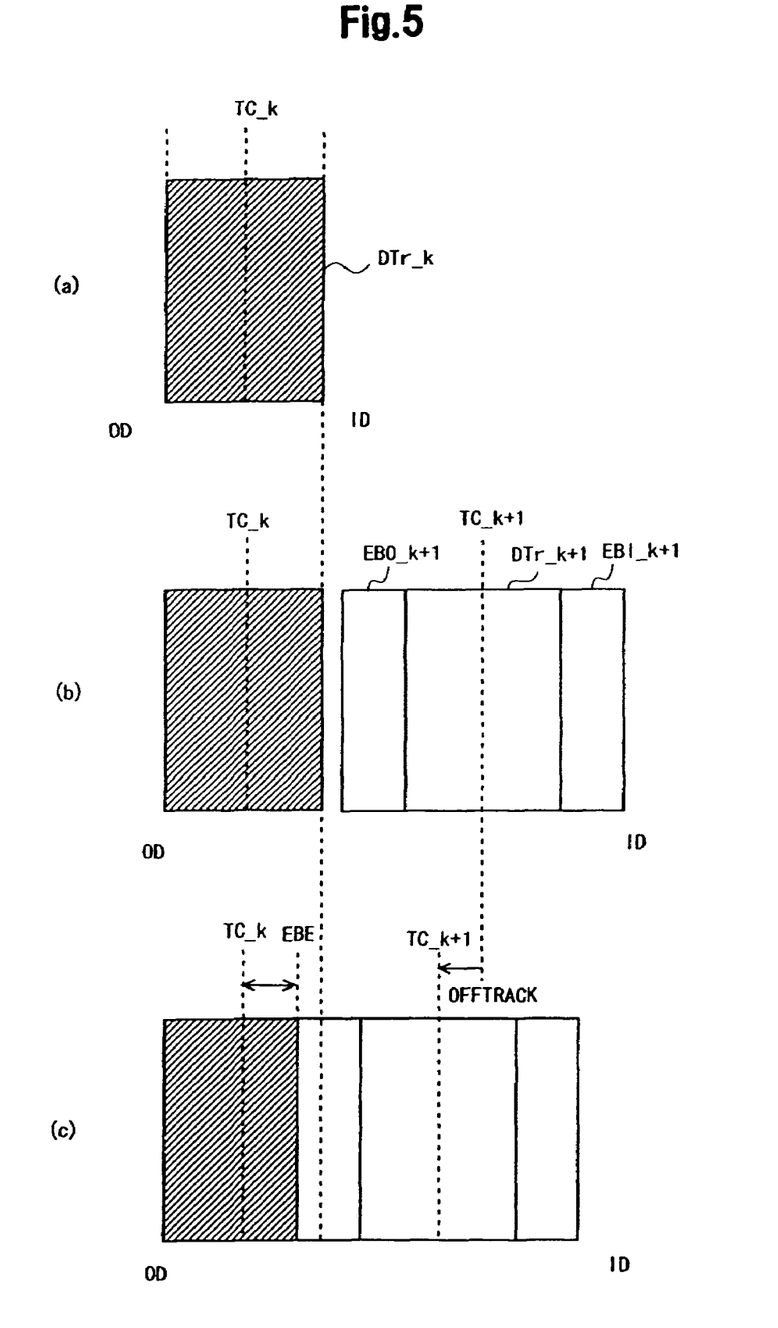
FIGS. 5(a)-5(c) are drawings illustrating a method for determining an erase band end for setting the data track pitch in one embodiment.

Hereinafter, methods for determining an erase band end and specifying a data track pitch will be described more specifically. Hereinafter, an example in which a control circuit mounted in the HDD 1 specifies the data track pitch will be described. The same process can be performed by a control circuit of a manufacturing apparatus. As shown in FIG. 5(a), the HDC/MPU 23 controls the actuator 16 and the head slider 12 to write a data track DTr_k at a target position TC_k on a recording surface. The target position TC_k is a central position of the data track DTr_k and is the servo address indicated by servo data. For example, the target position TC_k may be the middle of a specific servo track.

Next, the HDC/MPU 23 measures the error rate in the written data track DTr_k to locate the data track end positions (servo address) of the data track DTr_k. In the example of FIG. 5(a), it locates the inner data track end. Specifically, the HDC/MPU 23 retrieves data at different radial positions on the data track DTr_k and measures the error rates. The positioning of the head slider 12 is based on servo data. This is the same as the head positioning described below. The HDC/MPU 23 determines that the positions where the error rates are the reference value are the data track ends.

For example, the HDC/MPU 23 starts to measure error rates from the center TC_k of the data track DTr_k. Then, the HDC/MPU 23 moves a read element slightly toward the inner diameter (2 PES for example), and measures the error rate again at the position. The HDC/MPU 23 repeats the movement of the read element toward the inner diameter and measurements of the error rate, and locates the position where the error rate is the reference value. The position is the inner track end of the data track DTr_k. Typically, the HDC/MPU 23 measures the error rate at a single position for a plurality of times and compares the average of the measurements with the above reference error rate value.

Next, the HDC/MPU 23 writes a data track adjacent to the data track DTr_k. In the example of FIG. 5(b), an inner adjacent data track DTr_k+1 is written to the target position (TC_k+1). In the example of FIG. 5(b), the erase band of the data track DTr_k+1 does not overlap the data track DTr_k. Therefore, the erase band end of the data track DTr_k+1 cannot be located.

Specifically, after writing the data track DTr_k, the HDC/MPU 23 positions a read element to the inner track end of the data track DTr_k and measures the error rate. Preferably, the HDC/MPU 23 calculates the average of the error rates measured for a plurality of times. If the value is the same as the reference error rate value or is within a specific range including the reference error rate value, the HDC/MPU 23 determines that there is no influence from the adjacent data track DTr_k+1.

Next, the HDC/MPU 23 moves the target position TC_k+1 to be off-track toward the outer diameter and writes a new data track DTr_k+1. An appropriate value has been preset to the off-track amount in accordance with the design. In the example of FIG. 5(c), the erase band end EBE of the off-track data track DTr_k+1 overlaps the data track DTr_k. The HDC/MPU 23 retrieves the data track DTr_k to locate the erase band end EBE. Specifically, the HDC/MPU 23 controls the actuator 16 to position the head slider 12 at a plurality of positions on the data track DTr_k and retrieves the data and measures the error rate at each of the position.

For example, the HDC/MPU 23 first positions the read element to the inner track end of the data track DTr_k and measures the error rate. It is preferable to measure error rates at the same position for a plurality of times and use the average. If the measured error rate is greater than the above reference value, the HDC/MPU 23 shifts the target position toward the outer diameter and measures the error rate again. The HDC/MPU 23 repeats the slight movement of the head slider 12 and the measurement of the error rate to locate the servo address at the position where the error rate is the above reference error rate value. The position is the erase band end EBE of the adjacent data track DTr_k+1.

The HDC/MPU 23 measures in the same manner with respect to the relationship between the data track DTr_k and the outer adjacent data track DTr_k−1. In this measurement, it is preferable that the positions where the outer adjacent data track DTr_k−1 and the inner adjacent data track DTr_k+1 are written be symmetrical with respect to Tc_k. The movement amount of the outer adjacent data track DTr_k−1 in bringing it closer to the data track DTr_k should be the same as the one of the inner adjacent data track DTr_k+1.

The HDC/MPU 23 locates the erase band ends of data tracks DTr_k−1 and DTr_k+1 on the both sides of the subject data track DTr_k by measuring with respect to the relationship between the data track DTr_k and the outer adjacent data track DTr_k−1. Specifically, the HDC/MPU 23 obtains the distances from the centers of the two adjacent data tracks DTr_k−1 and DTr_k+1 to their erase band ends in PES values.

The HDC/MPU 23 specifies the data track pitch so that the distance between the erase band ends of the two adjacent data tracks will be within the predetermined reference range. This data track pitch is the data track pitch at the radial position of the measurement. The data track pitch is expressed by servo data (in PES). Preferably, the data track pitch is specified so that the distance between the erase band ends will be the predetermined reference value. The reference value incorporates the minimum value of the values at which the possibility of a squeeze error is nearly zero and fluctuation width of the write element in data write. Typically, the HDC/MPU 23 specifies the data track pitch at this radial position so that each of the erase band ends of the both adjacent data tracks will conform to the middle position of the central data track.

The HDC/MPU 23 performs the same measurements on a plurality of radial positions on a recording surface and specifies data track pitches at the measuring points. The HDC/MPU 23 calculates a curve of the data track pitch varying depending on the radial position. This curve is an approximated curve of the measurements and the measurements are not always on the curve. The HDC/MPU 23 specifies the data track pitch in the same manner as in the above description on each recording surface (head slider 12) and calculates an approximated curve to indicate the data track pitch of each recording surface. The HDC/MPU 23 locates a servo address on the recording surface from the address designated by the command from a host 51 using the approximated curve of the specified data track pitch. The HDC/MPU 23 may specify the data track pitch so as to interpolate the measurements. This achieves more appropriate data track pitch depending on the radial position.

In the above example, the HDC/MPU 23 determines erase band ends of adjacent data tracks DTr_k−1 and DTr_k+1 on both sides of the subject data track DTr_k, but the HDC/MPU 23 may determine the erase band end of either one of those adjacent data tracks and specify the data track pitch from the determination. The HDC/MPU 23 regards both adjacent data tracks and their erase bands to be symmetrical. That is, the HDC/MPU 23 specifies the data track pitch assuming that the distance from the center of the measured adjacent track to the erase band end is same as the other adjacent data track.

Figure 6:
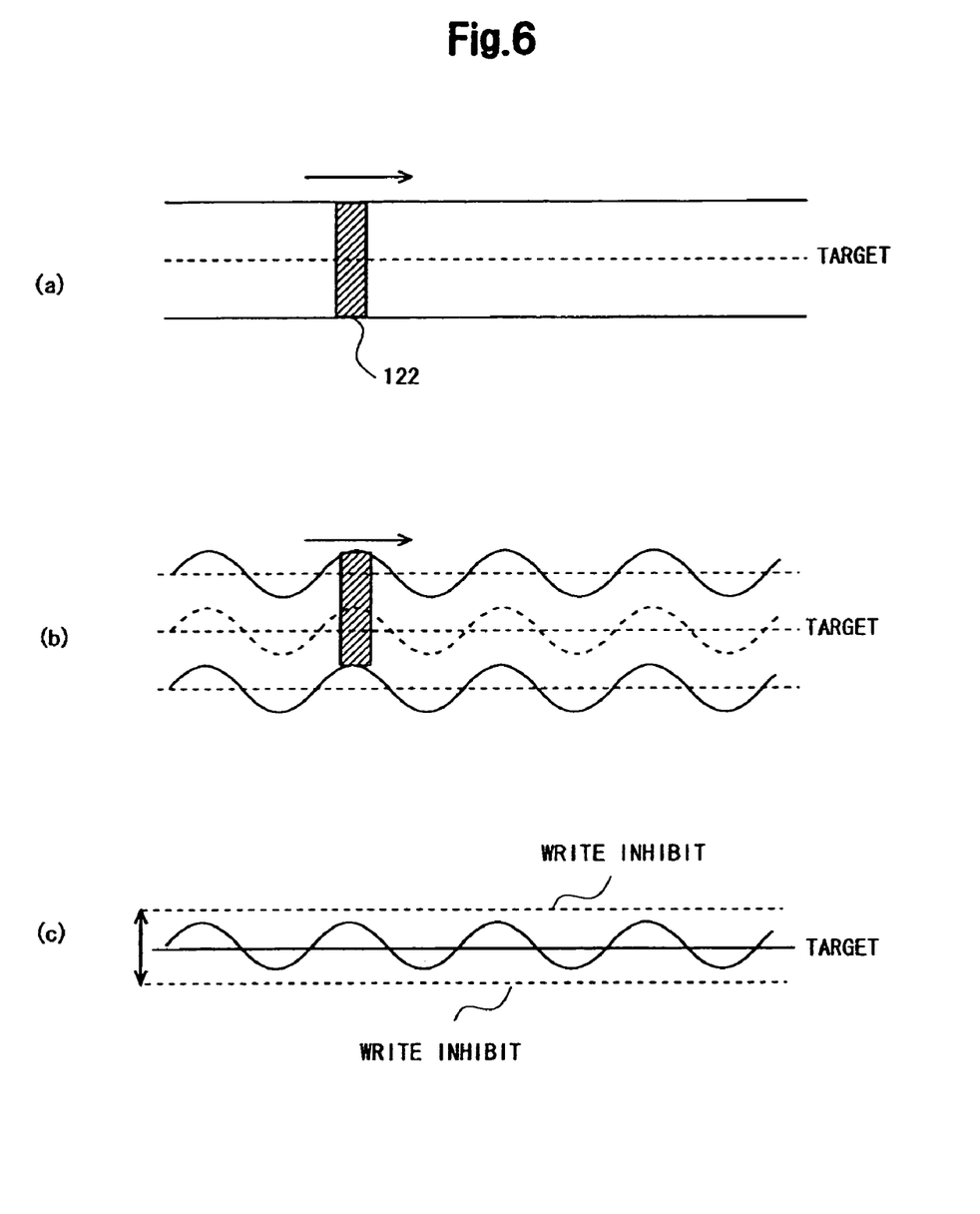
FIGS. 6(a)-6(c) are drawings schematically illustrating deflection of a write element in data write in one embodiment.

In a track following for data write, the head slider 12 vibrates in the radial direction with respect to the target position to be the center. As shown in FIG. 6(a), a write element 122 performs an accurate following on the target position in ideal control. However, in actual servo control, some deflection of the write element 122 from the target position is permitted. As shown in FIG. 6(b), the write element 122 writes data while vibrating in the radial direction. If the write element 122 (head slider 12) gets away from the target position over a write inhibition value, the HDC/MPU 23 stops the data write. For example, if the write element 122 gets away 30 PES from the target position, the HDC/MPU 23 stops the data write.

Accordingly, as shown in FIG. 6(c), it is understood that the locus of the write element 122 should be between the inhibit values with the target centered therebetween and the travel from the track center is substantially the same as the write inhibition value when the data track comes closest to the adjacent data track. It is important to take account of this deflection of the position of the write element 122 (fluctuation in servo positioning accuracy) in specifying the data track pitch. The data track pitch is specified so that the erased data track will still have a track width of the reference value or more even if the write element 122 wobbles and erases a part of the adjacent track.

The data track width SW of the data track DTr_k becomes smallest when both adjacent data tracks DTr_k−1 and DTr_k+1 are closest to the data track DTr_k. It is necessary that this data track width (the distance between the erase band ends) be no less than the data track width which causes an error. In specifying the data track pitch, the value is used which is obtained by adding the write inhibition value for the adjacent data track to the requisite minimum data track width. For example, if the minimum data track width is 100 PES and each of the write inhibition values of the data tracks on the both sides is 30 PES, the data track pitch is specified so that the distance between the erase band ends at the target position on the data tracks on the both sides will be 160.

Hereinafter, a method for specifying a data track pitch according to one embodiment will be discussed quantitatively. First, a BATHTUB will be explained. The BATHTUB corresponds to the data track width. In other words, a read element starts retrieving data from the center of data track and then repeats retrieval with changing the target position bit by bit. Then, the HDC/MPU 23 determines how accurately the read element can retrieve the data at each position. The width where the data could be retrieved with a specific rate or more is the BATHTUB. The HDC/MPU 23 uses an error rate as a reference index to determine how accurately it could retrieve. According to the above example, the width with the error rate of 10-4 or less is the BATHTUB. The width is expressed in PES.

Figure 7:
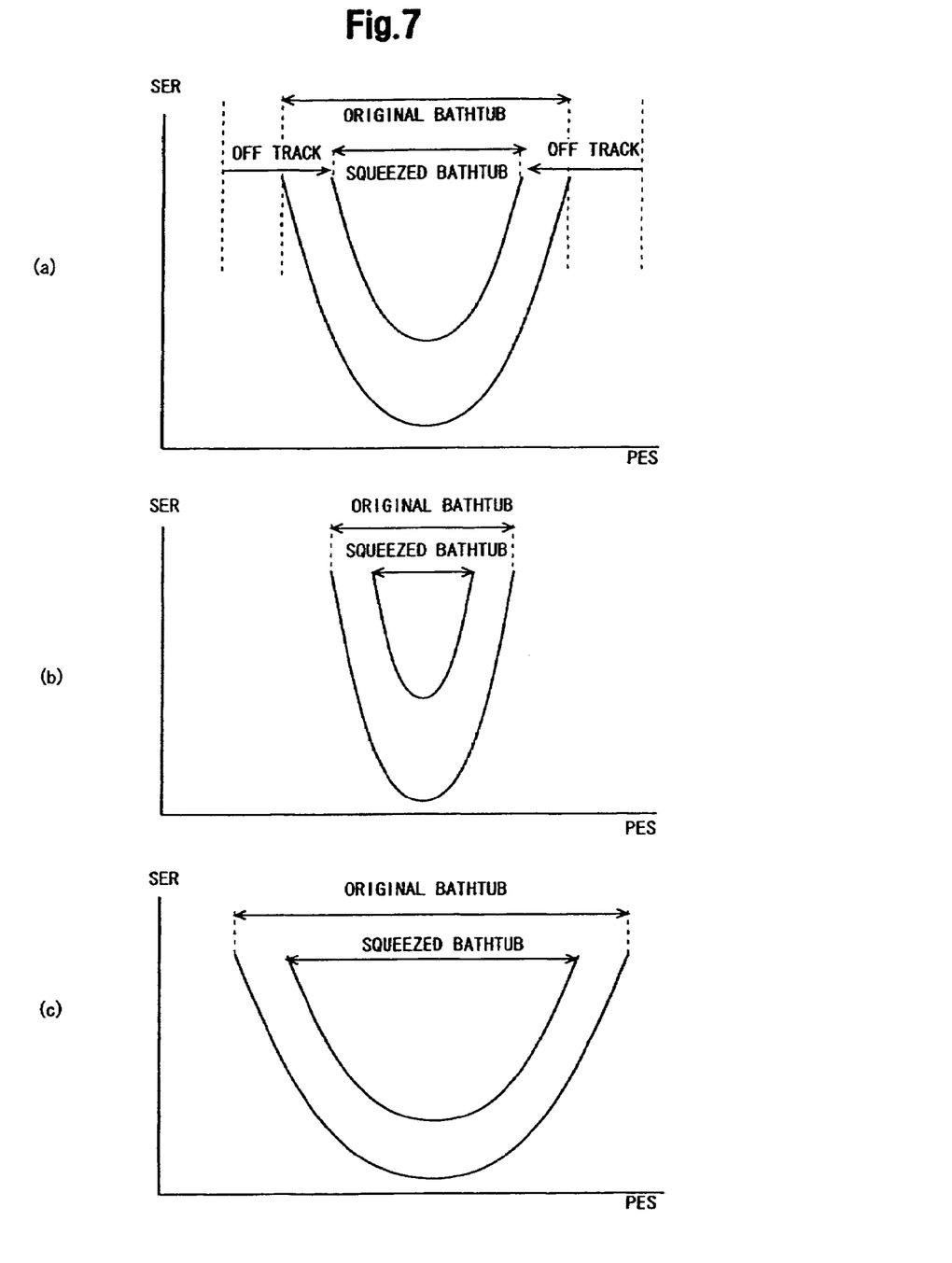
FIGS. 7(a)-7(c) are drawings illustrating a BATHTUB for a quantitative discussion on the method for specifying the data track pitch in embodiments of the present invention.

When data tracks on the both sides are written squeezed, the BATHTUB occasionally changes as shown in FIG. 7(a). The horizontal axis of FIG. 7(a) corresponds to PES and the vertical axis corresponds to error rates. The BATHTUB before squeezed writing is called an ORIGINAL BATHTUB; the BATHTUB after squeezed writing is called a SQUEEZED BATHTUB; and how many PES values are squeezed in writing is called an OFFTRACK amount.

The fact that a data track is not erased even after its adjacent track has been written means that the ORIGINAL BATHTUB does not change even if the adjacent data track is written. As in FIG. 5(b), if the adjacent data track is written sufficiently away from the subject data track, the ORIGINAL BATHTUB does not change. However, as the position of writing the adjacent data track is gradually brought closer to the subject data track, the BATHTUB starts to become narrow from a certain position. Assuming the BATHTUB becomes narrower in proportion to the OFFTRACK amount after the BATHTUB has started to become narrow, there is no problem if the data track is squeezed by OFFTRACK(ORIGINAL BATHTUB−SQUEEZED BATHTUB)/2 (it is the same when it is loosened).

In a normal operation, whether or not the data track can be accurately retrieved depends on the data track width, namely the BATHTUB, to a great extent. Therefore, one embodiment specifies the data track pitch so as to ensure the BATHTUB after being squeezed to be larger than the criteria. If the ORIGINAL BATHTUB is narrow as shown in FIG. 7(b), slight erasure (squeeze) by the adjacent data track makes the SQUEEZED BATHTUB very small. On the contrary, if the ORIGINAL BATHTUB is wide as shown in FIG. 7(c), a sufficient width of the SQUEEZED BATHTUB is ensured even if a certain amount of erasure is caused by the adjacent data track.

Taking account of the servo positioning accuracy (deflection of the write element 122 in data write), the appropriate basis to obtain the possible maximum data capacity is the data track width ensured after the adjacent data track has been written. Even if the subject data track is erased to some extent by writing the adjacent data track, it is assured that the requisite BATHTUB (track width) for the subject data track is left.

For example, the fluctuation in positioning of the head slider 12 (the above write inhibition value) is assumed to be 30 PES. The data track pitch is specified from the point that the SQUEEZED BATHTUB should be assured to some extent when the both adjacent data tracks are moved off track by 30 PES.

If the target value of the SQUEEZED BATHTUB is assumed to be a TARGET, the data track should be corrected so as to eliminate the difference from the TARGET. Taking in consideration that the data track pitch of the adjacent data track is corrected in the same manner, the correction TP of the data track pitch can be expressed by:

TP=(TARGET−SQUEEZED BATHTUB)/2.

If the OFFTRACK amount is variable, it is expressed by:

TP=((TARGET+2×30)−(SQUEEZED BATHTUB+2× OFFTRACK))/2.

As set forth above, the present invention is described by way of particular embodiments but is not limited to the above embodiments. Embodiments of the present invention can of course be modified in various ways within the scope of the substance of the present invention. For example, in the above embodiments, an HDD has been described by way of example but embodiments of the present invention can be applied to a disk drive device using other kinds of disks.

To raise the accuracy in determination, it is preferable to use a data track actually written by a head slider, but it is possible to use other data. For accuracy and swiftness of the determination, the data track pitch may be specified depending on the head characteristics after writing servo data but it is possible to apply embodiments of the present invention to specifying a servo track pitch. It is preferable to define a data track end and erase band ends based on error rates but may be defined in accordance with other indexes such as reading amplitude. It is preferable to specify data track pitches for all of the recording surfaces according to embodiments of the present invention but embodiments of the present invention can be applied to a part of the recording surfaces or a part of a recording surface.

What is claimed is:

1. A method for specifying a data track pitch of a recording surface in accordance with characteristics of a head in a disk drive device comprising:
    writing adjacent data tracks on both sides of a subject data track on a recording surface; measuring error rate variation of data preliminarily recorded on the recording surface caused by at least one of the adjacent data tracks to determine erase band ends of the adjacent data tracks; and specifying a data track pitch of the recording surface based on a distance between the erase band ends of the adjacent tracks on both sides of the subject data track.

2. The method according to claim 1, wherein servo tracks are preliminarily recorded on the recording surface; at least one of the adjacent data track is written at a target servo address; the erase band end is determined using servo data; and the data track pitch is specified based on the distance between the erase band ends indicated by the servo data.

3. The method according to claim 1, wherein
    the adjacent data tracks are written on the both sides of the subject data track at target positions
    the erase band ends of the both adjacent data tracks are determined; and
    the data track pitch is specified based on the distance between the determined erase band ends of the both adjacent data tracks.

4. The method according to claim 1, wherein
    the data track pitch is specified for the distance to conform to a reference value.

5. The method according to claim 1, further comprising:
    writing the subject data track; and
    measuring error rate variation of the subject data track caused by the adjacent data track to determine an erase band end of the adjacent data track by servo data.

6. The method according to claim 1, further comprising:
    writing the subject data track;
    writing adjacent data tracks on the both sides of the subject data track; and
    measuring each error rate variation of the subject data track caused by the both adjacent data tracks to determine the distance.

7. The method according to claim 1, wherein the data track pitch to be specified includes a deflection range of a head which writes the adjacent data track in response to a command.

8. A method for manufacturing a disk drive device comprising: mounting a disk, a head for accessing a recording surface of the disk, and a moving mechanism for moving the head in an enclosure; writing adjacent data tracks on both sides of a subject data track on the recording surface with the head; measuring error rate variation of data preliminarily recorded on the recording surface caused by at least one of the adjacent data tracks using the head to determine erase band ends of the adjacent data tracks; and specifying a data track pitch of the recording surface based on a distance between the erase band ends of the adjacent data tracks on both sides of the subject data track.

9. The method for manufacturing a disk drive device according to claim 8, wherein servo tracks are preliminarily recorded on the recording surface; at least one of the adjacent data track is written at a target servo address; the erase band ends are determined using servo data; and the data track pitch is specified based on the distance between the erase band ends indicated by servo data.

10. The method for manufacturing a disk drive device according to claim 8, wherein
    the adjacent data tracks are written on the both sides of the subject data track at target positions
    the erase band ends of the both adjacent data tracks are determined; and
    the data track pitch is specified based on the distance between the determined erase band ends of the both adjacent data tracks.

11. The method for manufacturing a disk drive device according to claim 8, wherein
    the data track pitch is specified for the distance to conform to a reference value.

12. The method for manufacturing a disk drive device according to claim 8, further comprising:
    writing the subject data track; and
    measuring error rate variation of the subject data track caused by the adjacent data track to determine an erase band end of the adjacent data track by servo data.

13. The method for manufacturing a disk drive device according to claim 8, further comprising:
    writing the subject data track;
    writing adjacent data tracks on the both sides of the subject data track; and
    measuring each error rate variation of the subject data track caused by the both adjacent data tracks to determine the distance.

14. The method for manufacturing a disk drive device according to claim 8, wherein
    the data track pitch to be specified includes a deflection range of a head which writes the adjacent data track in response to a command.

15. A disk drive device for specifying a data track pitch of a recording surface in accordance with characteristics of a head comprising: a recording surface of a disk for storing data; a head for writing adjacent data tracks on both sides of a subject data track on the recording surface; and a controller for measuring error rate variation of data preliminarily recorded on the recording surface caused by at least one the adjacent data tracks to determine erase band ends of the adjacent data tracks, and specifying a data track pitch of the recording surface based on a distance between the erase band ends of the adjacent data tracks on both sides of the subject data track.

* * * * *